May 5, 1953 G. HAGLUND 2,637,627
PROCESS FOR PREPARING RAW SULFITE ACID
Filed Aug. 5, 1947
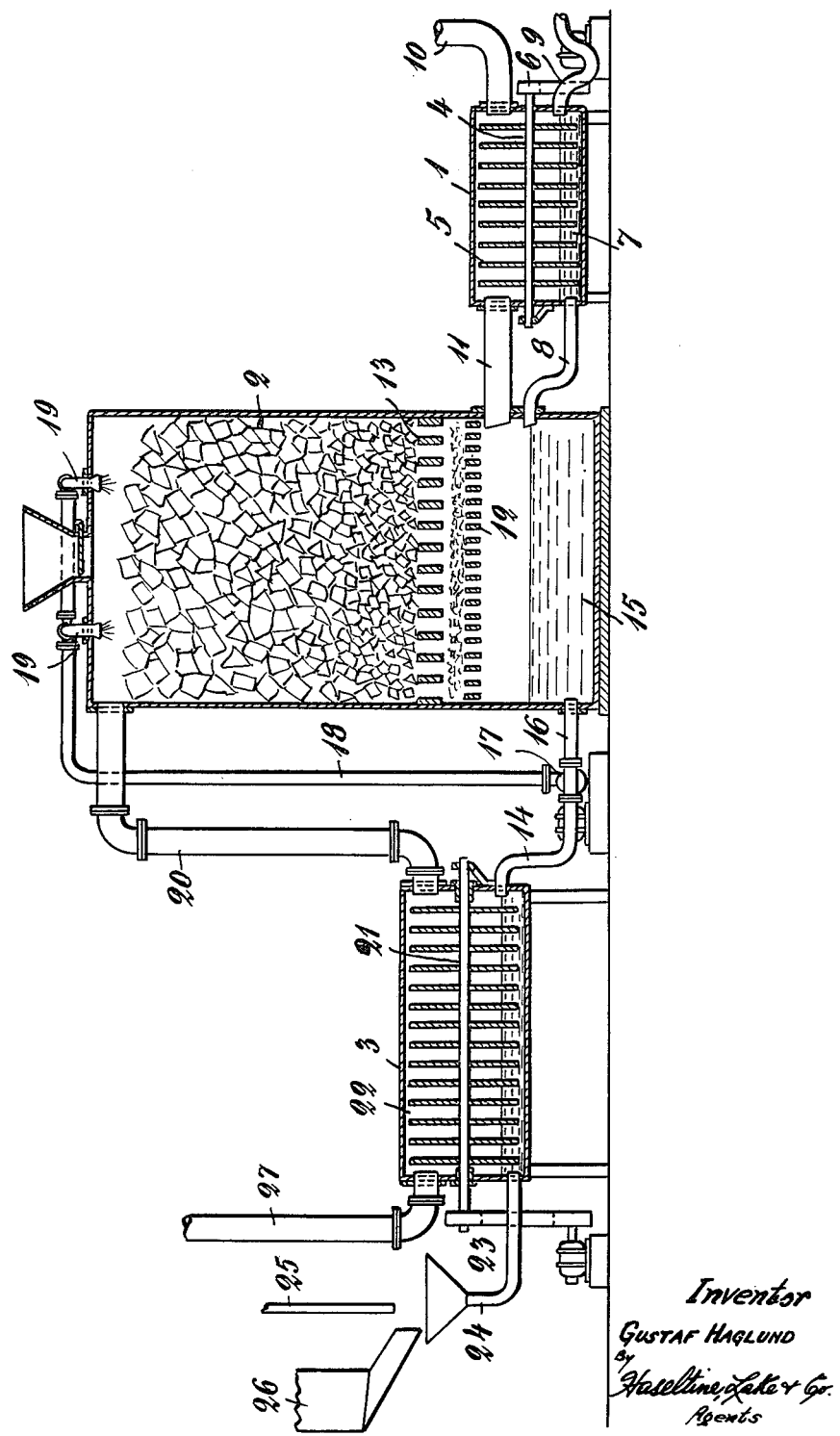
Inventor
GUSTAF HAGLUND
By Haseltine Lake & Co.
Agents Patented May 5, 1953

2,637,627

UNITED STATES PATENT OFFICE 2,637,627

PROCESS FOR PREPARING RAW SULFITE ACID

Gustaf Haglund, Storangen, near Stockholm, Sweden

Application August 5, 1947, Serial No. 766,244
In Sweden May 31, 1946

Section 1, Public Law 690, August 8, 1946
Patent expires May 31, 1966

4 Claims. (Cl. 23—130)

This invention relates to the preparation of raw sulphite acid of the kind used in the manufacture of sulphite pulp.

The object of the invention is to provide a process and apparatus for continual production of raw sulphite acid from $SO_2$ gases and the desired base material, whereby it is rendered possible considerably to reduce the dimensions of the acid production system and simultaneously to obtain an effective and quick absorption of the $SO_2$ gases and more effectively and accurately than hitherto to control and regulate the composition of the acid produced, independent of the working conditions prevailing.

For this purpose, according to the invention, $SO_2$ gases, substantially consisting of $SO_2$ gases from an $SO_2$-producing furnace—sulphur burner gases—are in an absorption phase of the process contacted, in excess, with acid already having the desired content of bisulphite, in an absorption apparatus provided with rotatable stirring devices, wherein said $SO_2$ gases and said acid are extremely intimately mixed with each other to build up the strength of the acid with free $SO_2$. Hereby, the supply of $SO_2$ gases is regulated in such a way that at most 25% of the total $SO_2$ content of the gas is absorbed. The remaining $SO_2$ gases are then conducted to a bisulphite producing phase of the process, in which they are passed in contact with base material in excess and a solution formed in this phase by the reaction between the $SO_2$, said base material and water, which is continually supplied to the plant in a quantity corresponding to the quantity of raw acid to be produced and continually drawn off from the plant. The conditions of absorption in said bisulphite producing phase of the process is regulated in such a way that the $SO_2$ content of the gas is practically completely absorbed, while producing an acid with the desired concentration of bisulphite, which is continually passed into the absorption phase of the process where the enrichment of the acid with free $SO_2$ takes place.

Any one of the two above-mentioned phases of the process may consist of one or more stages. So, for instance, in case of producing calcium bisulphite liquor, the bisulphite producing phase of the process may comprise two lime towers—a weak acid tower and a strong acid tower—or a lime tower containing limestone in lumps and an absorption apparatus of the above-mentioned type with rotatable stirring devices containing a suspension of lime in water. In the latter case the $SO_2$ gases passing off from the absorption or enrichment phase of the process are first conducted into the lime tower containing limestone in the form of lumps in counter-current flow to weak acid passing downwards through the tower, where the main part of the $SO_2$ contained in the gas is combined with the lime to produce bisulphite, and then into the said absorption apparatus in contact with a suspension of lime in water continually supplied to said absorption apparatus, said water being supplied in a quantity substantially corresponding to the quantity of raw acid to be produced and continually drawn off from the plant. Ultimately the quantity of water is determined by the quantity of cooking liquor required for the digesters. The poor $SO_2$ gas from the lime tower entering said absorption apparatus will be extremely intimately mixed with the lime and water by means of said rotating stirring devices in order to obtain a practically complete absorption of the $SO_2$ of the gas therein, while producing weak acid. Said weak acid is then passed through the lime tower in countercurrent relationship to the $SO_2$ gases as described, while producing raw acid with the desired concentration of calcium bisulphite, which raw acid is conducted into the first-mentioned phase of the process where the enrichment of the acid with free $SO_2$ takes place.

In said embodiment of the process liquor collected in the lower part of the lime tower may advantageously be recycled through the lime tower in order to facilitate and promote the dissolution of lime and the formation of calcium bisulphite and to ensure the production of a raw acid with the desired content of lime.

By way of example the process according to the invention, applied for the production of calcium bisulphite liquor, is now described with reference to the accompanying drawing which shows one form of a plant according to the invention, comprising two absorption apparatuses 1 and 3 of the type indicated above and a lime tower 2, in combination, with which plant the said process may be carried out.

In the drawing 1 is an absorption apparatus consisting of a cylindrical container, disposed horizontally, in the centre of which is a rotatable shaft 4 on which are mounted radially placed perforated discs or plates 5, which may be replaced by rods, in a suitable number and of a sufficient area for forming a suitable contact surface when rotated by means of the driving mechanism 6. Upon rotation said discs or plates pass through the liquid space 7 in the lower part of the container, through which is conveyed strong acid already having its desired content of calcium bisulphite, supplied from the lime tower 2 through the pipe 8. A constant level of liquid is maintained in the container by means of a discharge pipe 9 disposed at a suitable height over the bottom of the container, as shown in the drawing. The gas conduit 10 serves for supply of $SO_2$ gases to the apparatus 1 and after absorption therein the rest of said $SO_2$ gases are passed through the gas conduit 11 to the lime tower 2.

By appropriate regulation of the supply of $SO_2$ gases in relation to the supply of acid and by a suitable regulation of the speed of rotation of the stirring devices therein, it is possible to enrich the acid with free $SO_2$ and deprive the gases of $SO_2$ in the degree required for obtaining a residual gas having exactly the content of $SO_2$ suitable for the formation of bisulphite in the following phase.

The lime tower 2 is provided with a finer grating 12 and a coarser grating 13 somewhat higher up in the tower serving as supports for limestone in lump form filling the main part of the tower. By means of a pipe 14, a pump 17, and a pipe 18 with spraying devices 19 arranged at the top of the tower, the lime tower is connected with the absorption apparatus 3. Weak acid produced in said apparatus is by means of the pump 17 transferred to the top of the lime tower and spread over the limestone therein. On its way downwards through the tower 2 the acid trickling down on the limestones meets the $SO_2$ gases supplied from the conduit 11 and passing upwards through the tower. Hereby the main part of the $SO_2$ content of the gases is absorbed, and a reaction takes place resulting in the formation of calcium bisulphite (strong acid).

In the lower part of the tower 2 below the grating 12 is a free space 15, serving as a liquid collecting chamber. Said chamber is by means of a pipe 16 connected with the pump 17 and the pipe 18 and hereby it is possible, by means of said pump, to circulate liquid from the chamber 15 to the top of the lime tower and to ensure the desired content of lime in the acid. A constant level of liquid is maintained in the chamber 15 by means of the before-mentioned overflow pipe 8.

For the discharge of the diluted $SO_2$ gases remaining after the absorption in the lime tower there is arranged a gas conduit 20 connecting the upper part of the tower 2 with the absorption apparatus 3.

Said absorption apparatus 3 is of similar type and construction as the absorption apparatus 1 already described. Consequently, it consists of a cylindrical container having a rotatable shaft 21 on which are mounted perforated discs or plates 22, and which is arranaged to be driven by means of the driving mechanism 23. The conduit 24 provided with a funnel-shaped opening at the top serves for the supply of water (from the pipe 25) and of finely divided lime (from the lime pocket 26) to the absorption apparatus 3. A constant level of liquid is maintained in said apparatus by means of the before-mentioned pipe 14, which serves as an overflow pipe. For discharge of the exhaust gases from the apparatus 3 is arranged a conduit 27.

By suitably regulating the proportions of lime introduced into the apparatus 3 as well as the speed of rotation of the stirring devices therein, a practically complete utilization of the ingredients supplied to the apparatus, including the $SO_2$ content of the gases, is obtained, while producing weak acid.

As a specific example of the application of the process according to the invention with the use of the above-mentioned plant may be mentioned the production of 300 litres per minute of raw acid (calcium bisulphite liquor) containing 1.00% CaO, 1.14% combined $SO_2$, 1.14% half-free $SO_2$ and about 0.6% free $SO_2$, consequently in total about 2.88% $SO_2$.

For this purpose, sulphur burner gases containing 12% of $SO_2$ are supplied through the conduit 10 to the absorption apparatus 1 in an amount corresponding to 8.64 kgs. $SO_2$ per minute. In the example chosen the acid in the absorption apparatus should be enriched with about 0.4% free $SO_2$, it being assumed that the acid supplied from the lime tower 2—300 litres per minute—already contains 0.2% of free $SO_2$. This absorption is effected by rotating the discs or contact surfaces 5 with a speed of about 300 to 600 revolutions per minute, and herefor is required 1.2 kgs. $SO_2$ per minute corresponding to 14% of the total amount of $SO_2$ supplied.

The gas discharged from the apparatus 1 through the conduit 11 consequently contains 10.32% $SO_2$, which means that 7.44 kgs. $SO_2$ per minute are supplied to the lime tower 2, this quantity being calculated to be appropriate for producing the correct percentages of calcium bisulphite. The tower 2 also receives 300 litres of weak acid per minute from the absorption apparatus 3 supplied by means of the pump 17 through the pipes 14 and 18 and the spraying devices 19. At the same time the pump 17 transfers a quantity of acid from the acid collecting chamber 15 at the bottom of the tower 2 through the pipes 16 and 18 to the top of the tower, and since the pump in the present example has a capacity of about 3 times the capacity of the acid production plant, or 900 litres per minute, 600 litres acid per minute is recirculated from the chamber 18 through the tower.

Under the conditions mentioned 5.6 kgs. of the $SO_2$ gas supplied to the lime tower is absorbed per minute, which corresponds to 65% of the total amount of $SO_2$ originally supplied to the plant (8.64 kgs.). Simultaneously limestone is dissolved. The reactions in the tower result therein that the $SO_2$ content of the acid is increased with 1.87%, which amount is consumed for the formation of calcium bisulphite, with the exception of 0.2%, which is present in the form of free $SO_2$. At the same time the base content of the acid is increased with 0.73% CaO.

The gases discharged from the lime tower through the conduit 20 to the absorption apparatus 3 contain 2.52% $SO_2$ and correspond to a quantity of 1.84 kgs. $SO_2$ per minute. In the same time the absorption apparatus 3 receives 300 litres of water per minute and a quantity of finely divided lime, for instance slaked burnt lime or lime sludge from the causticization operation in the sulphate pulp production, corresponding to 0.27% CaO in the quantity of water supplied. By rotating the stirring devices with a speed of about 300 to 600 revolutions per minute the total amount of $SO_2$ in the gas is absorbed, while producing a weak acid containing 0.61% $SO_2$ and 0.27% CaO in the form of bisulphite.

As will be clear from the foregoing, in the cited example, the whole quantity of water required for producing the desired amount of raw acid is supplied to the final absorption apparatus 3, as well as the quantity of finely divided lime necessary for reacting with the whole amount of $SO_2$ still present in the diluted gases to obtain a complete absorption thereof, while forming bisulphite. The weak acid thus formed of the composition already mentioned contains 21% of the total quantity of $SO_2$ and 27% of the total content of CaO of the raw acid to be produced. In the lime tower said weak acid is converted to a strong acid by receiving the remaining 73% of CaO and further 65% of the $SO_2$ to be contained in the acid. Said strong acid of the composition 1.00% CaO, 1.14% of CaO, 1.14% half-free SO₂ and 0.2% free SO₂ is then in the absorption apparatus 1 strengthened with 0.4% of free SO₂ corresponding to 14% of the total SO₂ content of the acid, and from here the raw acid with the desired composition is discharged.

The efficiency of the process described is very high and due hereto the plant for carrying out the process may be of extremely small dimensions and nevertheless have a great capacity.

In case of using only finely divided lime for the production of the acid, the lime tower 2 is replaced by an absorption apparatus of the same type and construction as the absorption apparatus 3 having approximately the same capacity as the tower 2.

For the production of sodium bisulphite liquor it is, likewise, only necessary to use absorption apparatuses with rotatable surfaces of the type described.

I claim:

1. A continuous process for preparing raw sulphite acid which comprises, in an absorption zone, passing a gas containing SO₂, and obtained substantially from a furnace producing SO₂, over acid already having the desired content of bisulphite, moving a solid body alternatingly through said acid and gas in said zone for intimately mixing said acid and gas to increase the free SO₂ content of said acid, the supply of SO₂ to said absorption zone and the movement of said solid body being adjusted in such a way that at most 25% of the total SO₂ content of the gas is absorbed, conducting the remaining SO₂ containing gases from said absorption zone to a bisulphite producing zone containing a basic material of at least one metal of the group consisting of calcium, and sodium, continually supplying water to said bisulphite producing zone in a quantity corresponding to the quantity of raw acid to be produced, contacting the said SO₂ containing gases in said bisulphite producing zone with said water and said basic material to produce an acid having the desired content of bisulphite, the conditions of absorption in said bisulphite producing zone being adjusted in such a way that the SO₂ content of the gas is practically completely absorbed, and passing the acid with the desired content of bisulphite thus produced to said absorption zone.

2. A continuous process of producing raw sulphite acid, which comprises introducing SO₂ containing gas, consisting substantially of SO₂ containing gas from an SO₂ producing furnace, into an absorption zone, containing acid already having the desired content of calcium bisulphite in the absence of lime material, intimately mixing said SO₂ containing gases with said acid in said absorption zone to increase the free SO₂ content of said acid, the supply of SO₂ containing gases to the said absorption zone being so adjusted that at most 25% of the total SO₂ content of the gas is absorbed, conducting the remaining SO₂ containing gas from said absorption zone to a bisulphite producing zone comprising a first stage in which the SO₂ gases are passed through a confined mass of limestone in the form of lumps in counter-current flow to weak acid passing downwards through said mass of limestone, the main part of the SO₂ contained in the gas being thus combined with the lime to produce bisulphite, and a second stage in which the SO₂ gases are passed in contact with finely divided lime material and water which is continually supplied to this stage in a quantity substantially corresponding to the desired quantity of raw acid to be produced, mixing the poor SO₂ gases entering said second stage intimately with the lime material and water, moving a solid body alternately through said lime material and water and said poor SO₂ gases to obtain a practically complete absorption of the SO₂ of the gas therein while producing weak acid, passing said weak acid through the limestone mass as described, while producing acid with the desired concentration of calcium bisulphite, and then passing said acid into the absorption zone of the process.

3. The process according to claim 2, wherein liquor produced in first stage of the bisulphite producing zone is recycled through said limestone mass to ensure an effective dissolution of lime in said stage in order to produce an acid with the desired content of calcium bisulphite.

4. A continuous process for preparing raw sulphite acid liquor containing a predetermined percentage of bisulphite of at least one metal of the group consisting of calcium and sodium, which comprises passing a furnace gas containing sulphur dioxide through a first absorption stage in intimate contact with a liquor comprising an aqueous bisulphite solution obtained in a later stage of the process and which is substantially free from basic substance convertible into bisulphite of said metal, thereby to absorb in said solution at most 25% of the total sulphur dioxide of the gas mixture, contacting the remainder of said gas mixture in a dissolving stage with an excess of basic substance of at least one metal of said group and an aqueous sulphite liquid emanating from a later stage of the process to form an aqueous bisulphite solution, transferring said aqueous bisulphite solution from the dissolving stage to the first absorption stage, passing the remainder of the gas mixture through a second absorption stage in intimate contact with a liquor comprising basic substance of at least one metal of said group and an aqueous liquid thereby to absorb substantially all of the remaining sulphur dioxide of the gas mixture, transferring an aqueous sulphite liquid from said second absorption stage to said dissolving stage, supplying water to said second absorption stage, intimately mixing the gas mixture with the liquor by passing said gas over said liquor and moving a solid body alternatingly through said gas and liquor, and controlling the amount of gas mixture supplied and the amount of sulphur dioxide absorbed in said first absorption stage and the amount of water supplied in said second absorption stage, thereby to obtain in said dissolving stage an aqueous bisulphite solution containing the desired predetermined percentage of bisulphite.

GUSTAF HAGLUND.

References Cited in the file of this patent

UNITED STATES PATENTS

| Number | Name | Date |
|---|---|---|
| 1,458,310 | Richter | June 12, 1923 |
| 1,576,705 | Babcock | Mar. 16, 1926 |
| 1,616,703 | Richter | Feb. 8, 1927 |
| 1,747,047 | Bradley et al. | Feb. 11, 1930 |
| 2,081,112 | Statham et al. | May 18, 1937 |

FOREIGN PATENTS

| Number | Country | Date |
|---|---|---|
| 56,691 | Sweden | Mar. 12, 1921 |